US011698782B2

(12) United States Patent
Nucci et al.

(10) Patent No.: US 11,698,782 B2
(45) Date of Patent: Jul. 11, 2023

(54) DETERMINING CUSTOMIZED SOFTWARE RECOMMENDATIONS FOR NETWORK DEVICES

(71) Applicant: Cisco Technology, Inc., San Jose, CA (US)

(72) Inventors: Antonio Nucci, San Jose, CA (US); Martin Beverley, Oakland, CA (US); Ali Ebtekar, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 16/689,694

(22) Filed: Nov. 20, 2019

(65) Prior Publication Data

US 2021/0081189 A1   Mar. 18, 2021

Related U.S. Application Data

(60) Provisional application No. 62/901,012, filed on Sep. 16, 2019.

(51) Int. Cl.
*G06F 8/65* (2018.01)
*G06F 21/57* (2013.01)
(Continued)

(52) U.S. Cl.
CPC .............. *G06F 8/65* (2013.01); *G06F 16/252* (2019.01); *G06F 21/577* (2013.01); *H04Q 9/02* (2013.01);
(Continued)

(58) Field of Classification Search
CPC .. G06F 8/00–78; G06F 16/252; G06F 21/577; G06F 2221/033; G06F 8/65;
(Continued)

(56) References Cited

U.S. PATENT DOCUMENTS 7,644,404 B2   1/2010   Rao et al.
8,402,452 B2   3/2013   Baratti et al.
(Continued)

FOREIGN PATENT DOCUMENTS

CN   106201614 A   12/2016

OTHER PUBLICATIONS

Wang, Chih-Hsuan. "Using quality function deployment to conduct vendor assessment and supplier recommendation for business-intelligence systems." Computers & Industrial Engineering 84 (2015): 24-31. (Year: 2015).*

(Continued)

*Primary Examiner* — Craig C Dorais
*Assistant Examiner* — Joanne G Macasiano
(74) *Attorney, Agent, or Firm* — Lee & Hayes, P.C.

(57) ABSTRACT

Techniques for receiving operational preferences for operating network devices, and determining software updates for the network devices based on the operational preferences. A recommendation system may determine a group of network devices in a device network based on the network devices in the group performing a common functional role or have common attributes. The recommendation engine may further receive the operational preferences for the group of network devices from a user associated with the device network. These operational preferences may be continuously, or periodically, evaluated against actual operating conditions of the group of network devices to determine whether a risk metric associated with the actual operation conditions violates an operational preference. In some instances, the recommendation system may provide the user with access to a recommendation to run updated software that is more optimized for the network device and that satisfies the operational preferences of the user.

20 Claims, 8 Drawing Sheets

(51) Int. Cl.
  *G06F 16/25*    (2019.01)
  *H04Q 9/02*     (2006.01)
  *H04L 43/08*    (2022.01)
  *H04L 67/306*   (2022.01)
(52) U.S. Cl.
  CPC ........ *G06F 2221/033* (2013.01); *H04L 43/08* (2013.01); *H04L 67/306* (2013.01); *H04Q 2209/40* (2013.01)
(58) Field of Classification Search
  CPC ......... H04L 43/08; H04L 67/306; H04Q 9/02; H04Q 2209/40
  See application file for complete search history.

(56) References Cited

U.S. PATENT DOCUMENTS

| | | | | |
|---|---|---|---|---|
| 2015/0121485 | A1* | 4/2015 | Collins | G06F 8/61 726/5 |
| 2015/0244743 | A1* | 8/2015 | Jagad | G06F 21/577 726/1 |
| 2016/0162270 | A1* | 6/2016 | Kumar | G06F 3/0488 717/177 |
| 2017/0078322 | A1* | 3/2017 | Seiver | H04L 41/12 |
| 2019/0163467 | A1  | 5/2019 | Aabye et al. | |
| 2020/0265134 | A1* | 8/2020 | Cristina | G06F 21/54 |
| 2020/0274939 | A1* | 8/2020 | Sakib | G06F 11/3438 |
| 2020/0311630 | A1* | 10/2020 | Risoldi | G06F 3/0482 |

OTHER PUBLICATIONS

Dash, Gyana, et al. "Quasi-Optimal Software Recommendation Analytics System (OPERA) for Network Devices." (2018). (Year: 2018).*

Moran Jr, Anthony Terence. "Assessing and Extending the Common Vulnerability Scoring System." (2012). (Year: 2012).*

Vmware, "vSAN Build Recommendations for vSphere Update Manager", retrived at <<docs.vmware.com>>, Jun. 26, 2019, 3 pages.

* cited by examiner

600 ↘

```
┌─────────────────────────────────────────────────────────────────┐
│  IDENTIFY A GROUP OF NETWORK DEVICES IN A DEVICE NETWORK THAT   │
│  SHARE A COMMON FUNCTIONAL ATTRIBUTE, WHEREIN INDIVIDUAL ONES   │
│  OF THE GROUP OF NETWORK DEVICES ARE RUNNING FIRST SOFTWARE     │
│                              602                                 │
└─────────────────────────────────────────────────────────────────┘
                                  ↓
┌─────────────────────────────────────────────────────────────────┐
│  RECEIVE, FROM A USER ACCOUNT AND VIA A USER DEVICE, INPUT DATA │
│  DEFINING ONE OR MORE OPERATIONAL PREFERENCES ASSOCIATED WITH   │
│  THE GROUP OF NETWORK DEVICES                                    │
│                              604                                 │
└─────────────────────────────────────────────────────────────────┘
                                  ↓
┌─────────────────────────────────────────────────────────────────┐
│  COLLECT OPERATIONAL DATA THAT INDICATES A CURRENT OPERATING    │
│  CONDITION ASSOCIATED WITH THE GROUP OF NETWORK DEVICES         │
│  RUNNING THE FIRST SOFTWARE                                      │
│                              606                                 │
└─────────────────────────────────────────────────────────────────┘
                                  ↓
┌─────────────────────────────────────────────────────────────────┐
│  DETERMINE, BASED AT LEAST IN PART ON THE OPERATING CONDITION,  │
│  A RISK METRIC INDICATING A MEASURE OF RISK ASSOCIATED WITH THE │
│  GROUP OF NETWORK DEVICES RUNNING THE FIRST SOFTWARE            │
│                              608                                 │
└─────────────────────────────────────────────────────────────────┘
                                  ↓
┌─────────────────────────────────────────────────────────────────┐
│  DETERMINE THAT THE RISK METRIC VIOLATES THE ONE OR MORE         │
│  OPERATIONAL PREFERENCES                                         │
│                              610                                 │
└─────────────────────────────────────────────────────────────────┘
                                  ↓
┌─────────────────────────────────────────────────────────────────┐
│  IDENTIFY SECOND SOFTWARE CONFIGURED FOR EXECUTION BY            │
│  INDIVIDUAL ONES OF THE GROUP OF NETWORK DEVICES, WHEREIN THE    │
│  SECOND SOFTWARE SATISFIES THE ONE OR MORE OPERATIONAL           │
│  PREFERENCES AND IS ASSOCIATED WITH THE COMMON FUNCTIONAL        │
│  ATTRIBUTE OF THE GROUP OF NETWORK DEVICES                       │
│                              612                                 │
└─────────────────────────────────────────────────────────────────┘
                                  ↓
┌─────────────────────────────────────────────────────────────────┐
│  PROVIDE THE USER DEVICE WITH ACCESS TO A RECOMMENDATION TO RUN │
│  THE SECOND SOFTWARE ON INDIVIDUAL ONES OF THE GROUP OF NETWORK │
│  DEVICES                                                         │
│                              614                                 │
└─────────────────────────────────────────────────────────────────┘
```

FIG. 6

DETERMINING CUSTOMIZED SOFTWARE RECOMMENDATIONS FOR NETWORK DEVICES

RELATED APPLICATIONS

This application claims priority to U.S. Provisional Patent Application No. 62/901,012, filed on Sep. 16, 2019, the entire contents of which are incorporated herein by reference.

TECHNICAL FIELD

The present disclosure relates generally to determining software updates for network devices included in networks associated with users, and providing the users with recommendations for the software updates for the network devices that are tailored according to operational preferences of the users.

BACKGROUND

Users manage networks of computing devices (or "network devices"), such as enterprise networks and/or cloud service provider networks, to deliver various functionality and support different compute applications. Generally, there are various types of network devices that can be grouped based on device type (e.g., router, switch, wireless access points, etc.), functional role, software version, and so forth. Overtime, the features or functionality of these devices may deteriorate due to various reasons, such as the emergence of security vulnerabilities, increased software bugs, or may simply become outdated.

In light of this, software providers strive to provide accurate software updates for network devices to improve functionality and increase available features of the network devices, which in turn improves the functioning of the overall device network. Further, the software updates may provide service and security vulnerability fixes for discovered issues or bugs, which may help ensure the safe operation of the device network and overlaid business applications. Additionally, as technology continues to advance, updating device software for network devices to gain additional features and capabilities helps prevent the network devices from becoming obsolete and maintain operational value for longer periods of time.

However, providing accurate software updates for different users of network devices may prove difficult due to the different types of functionality and overlaid applications for the different users. For instance, a new software version may have undiscovered bugs that, if installed on network devices of a first user do not affect operations of the overall device network and functionality, but if installed on other network devices of a second user, may result in outages in the overall device network and overlaid functionality. Accordingly, it may be difficult to provide accurate recommendations for software updates for network devices in device networks of different users that support different overlaid applications or functionality.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for evaluating current operating conditions of a network device running first software against operational preferences for that network device, and providing a user device with a recommendation to run second software.

DESCRIPTION OF EXAMPLE EMBODIMENTS

Overview

Figure 1:
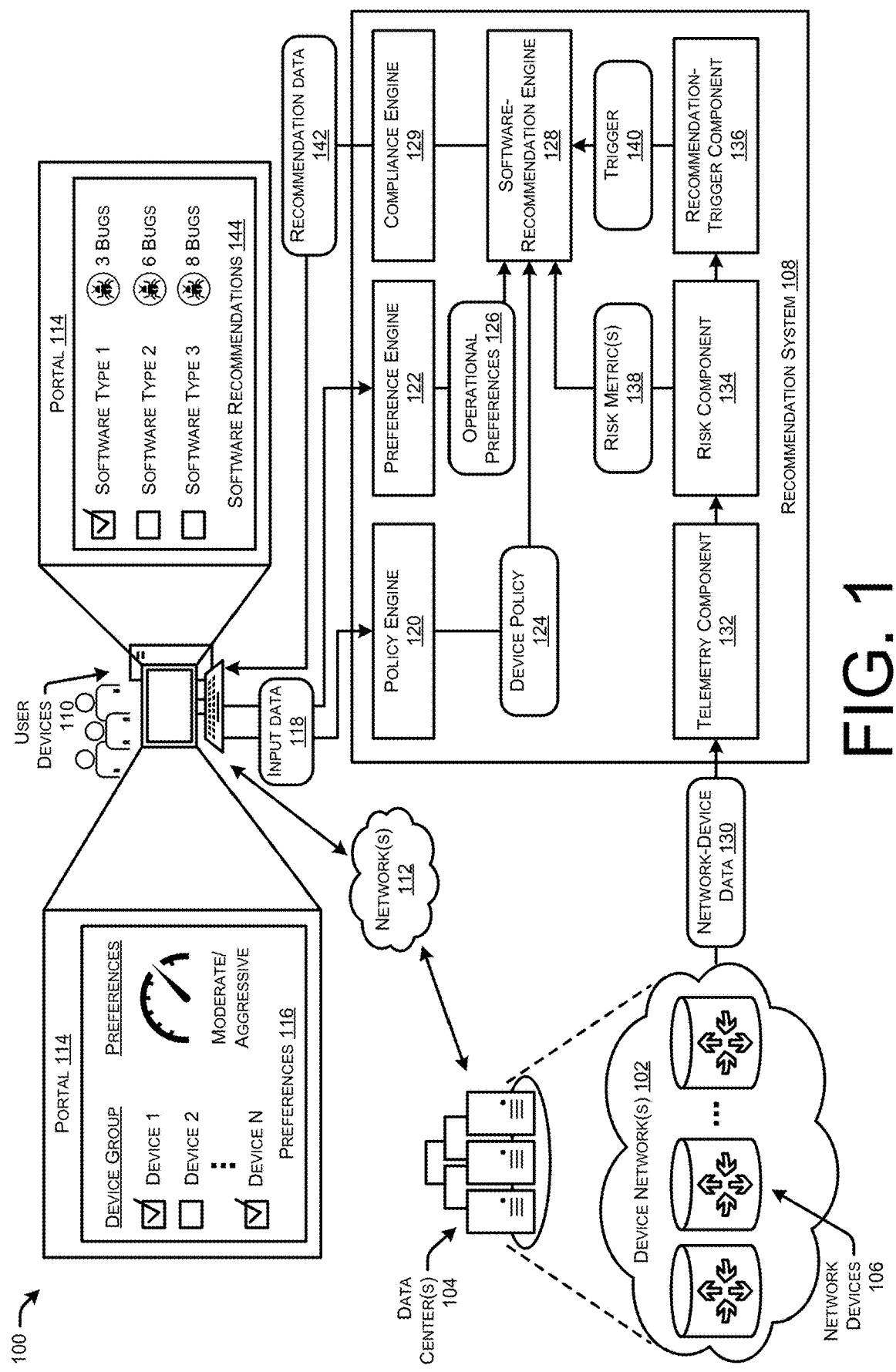
FIG. 1 illustrates a system-architecture diagram of an example recommendation system that determines software updates for network devices included in device networks of users, and provides the users with recommendations for the software updates for the network devices. The recommendation system may recommend software that is tailored according to operational preferences of the users.

This disclosure describes techniques for determining software updates for network devices included in device networks of users, and providing the users with recommendations for the software updates for the network devices that are tailored according to operational preferences of the users. A method to perform techniques described herein includes identifying a group of network devices in a device network that share a common functional attribute where individual ones of the group of network devices are running first software. Further, the method includes receiving, from a user account and via a user device, input data defining one or more operational preferences associated with the group of network devices. The method further includes collecting operational data that indicates a current operating condition associated with the group of network devices running the first software, and determining, based at least in part on the operating condition, a risk metric indicating a measure of risk associated with the group of network devices running the first software. The method may include determining that the risk metric violates the one or more operational preferences, and identifying second software configured for execution by individual ones of the group of network devices such that the second software satisfies the one or more operational preferences and is associated with the common functional attribute of the group of network devices. The method may further include providing the user device with access to a recommendation to run the second software on individual ones of the group of network devices.

Additionally, the techniques described herein may be performed by a system and/or device having non-transitory computer-readable media storing computer-executable instructions that, when executed by one or more processors, performs the method described above.

Example Embodiments

This disclosure describes techniques for receiving operational preferences for users of network devices, and determining software updates for the network devices based on the operational preferences of the users. According to the techniques described herein, a recommendation system may determine a group of network devices in a device network that are performing a common functional role, or have common attributes. The recommendation engine may generate a device policy for the group of network devices that can be used to drive recommendations for software updates for network devices in the group. The recommendation engine may further receive operational preferences for the group of network devices from a user associated with the device network. Some examples of the operational preferences may include a risk-tolerance level indicating an allowable measure of risk associated with software running on the network devices, a disallowed-operational list indicating security vulnerabilities or software bugs that are disallowed for the network devices, a preferred-operational list indicating a set of features (e.g., hardware features, software features, etc.) that are preferred to be associated with the group of network devices, etc. These operational preferences may be continuously, or periodically, evaluated against actual operating conditions of the group of network devices to determine whether a risk metric associated with the actual operation conditions violates an operational preference. In some instances, the recommendation system may provide the user with access to a recommendation to run updated software that is more optimized for the network device and that satisfies the operational preferences of the user. If a user accepts the recommendation to run the updated software that is determined to be more optimized for the network device, the recommendation system may further track the performance of the network device that is running the updated software to ensure compliance with the recommendation provided to the user.

Users may manage networks of computing devices (or "network devices"), such as enterprise networks and/or cloud service provider networks, to deliver various functionality and support different compute applications. There are often various types of network devices that can be grouped based on common device type (e.g., routers, servers, switches, wireless access points, etc.), functional role, software version, and/or other attributes. Often, these network devices run the same, or similar, software to achieve the common functional role. Overtime, the features or functionality of these devices may deteriorate due to various reasons, such as the emergence of security vulnerabilities, increased software bugs, or may simply become outdated. Accordingly, software providers for the software running on these devices develop and provide new software and software updates to users of the network devices to improve the functioning of the devices, and the overall device network. For instance, the new software may remedy known security vulnerabilities or bugs in the software, provide new features for the network devices to perform, and so forth.

However, providing accurate software updates for different users of network devices may prove difficult due to the different types of functionality and overlaid applications for the different users. For instance, a new software version may have undiscovered bugs that, if installed on network devices of a first user do not affect operations of the overall device network and functionality, but if installed on a network devices of a second user, may result in outages in the overall device network and overlaid functionality. Accordingly, it may be difficult to provide accurate recommendations for software updates for network devices in device networks of different users that support different overlaid applications or functionality. Thus, the techniques described herein include providing recommendations for software to run on network devices of users based on operational preferences of the users.

In some examples, a recommendation system may initially determine groupings of network devices in a device network of a user. For instance, a user may have an account associated with the recommendation system, and provide information indicative of groupings of network devices based on common functional role and/or other attributes. In some instances, the information may simply comprise explicit input via a user interface that allows the user to indicate which network devices are to be included in a particular group. In other instances, the recommendation system may be provided with network data, such as telemetry data, configuration data, etc., for the network devices in the device network of the user. The recommendation system may be configured to analyze the network data and determine groupings of the network devices based on common functional roles and/or other attributes. The recommendation system may generate a device policy for a group of network devices that generally indicates that the network devices having a same device policy have the same/similar software and provide the same/similar features. In this way, a device policy may define functional requirements for the group of network devices with which it is associated. The recommendation system may utilize the device policy, and associated metadata, to determine requirements for software and upgrades for the group of network devices associated with the device policy.

The recommendation system may further receive operational preferences from the user indicating requirements and preferences for the software running on their network devices. The operational preferences may indicate many different types of preferences or requirements. For instance, the operational preferences may indicate a risk-tolerance level for software running on the network devices, a minimum/maximum release age of the software, a minimum/maximum release popularity, preferred/required software features, software bugs to avoid, security advisories to avoid, and so forth. The operational preferences may then be associated with the device policy of the group of network devices for which the operational preferences are to be applied. For instance, the recommendation system may store indications of the operational preferences in association with the device policy for the group of network devices. In this way, the device policy may indicate functional requirements for software that is determined to run on the group of network devices, and also operational preferences for the software that is determined to run on the group of network devices.

In some examples, current software running on the group of network devices may satisfy the functional requirements and operational preferences associated with the group of network devices. However, over time the features or functionality of these network devices may deteriorate due to various reasons, such as the emergence of security vulnerabilities, increased software bugs, or may simply become outdated. Accordingly, the recommendation system may periodically, or continuously, evaluate current operating conditions of the network devices against the functional requirements and/or operational preferences. As an example, the recommendation system may collect or obtain various data indicating current operation conditions for the group of network devices, such as telemetry data for the network devices, configuration data for the network devices, and so forth. The recommendation system may, as described in more detail below, analyze this data and/or other data to determine whether the current operating conditions of the group of network devices violates the operational preferences. As a specific example, the recommendation system may determine a risk metric indicating a measure of risk associated with the group of network devices running the current software. The recommendation system may further determine that the risk metric violates a risk-tolerance level indicated in the operational preferences of the device policy for the group of network devices.

The recommendation system may determine that current operating conditions of the group of network devices running the current software violates operational preferences included in the device policy for the group, and determine optimized software for the group of network devices to upgrade to or otherwise migrate to. For instance, the recommendation system may determine that the optimized software, if ran on the group of network devices, would satisfy risk-tolerance levels in the operational preferences, includes features that are included in the preferred-operational list, does not include security vulnerabilities or software bugs defined in the disallowed-operational list, etc. The recommendation system may provide a user device associated with the group of network devices a recommendation that the group of network devices run the optimized software. Additionally, the recommendation may include information indicating why the optimized software is in fact optimized to be run on the group of network devices based on the operational preferences.

In some examples, a user may access the recommendation via a user device and provide input associated with the recommendation. For example, the user may provide input indicating that they would like to save the recommendation for later review, cancel the recommendation, accept the recommended upgrade for the software, etc. In this way, the user may act on the recommendation provided by the recommendation system to help optimize the operation of the network devices by causing the network devices to run or upgrade to software that is optimized for the operational preferences of the group of network devices.

Generally, the techniques described herein may improve techniques for at least (i) determining when to upgrade network devices based on known issues, (ii) determining to what software the network devices ought to be upgraded, (iii) helping users differentiated between multiple software options based on their operational preferences, and (iv) helping users track the performance of their upgraded network devices to ensure that performance of the network devices comply with the recommendations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example recommendation system 108 that determines software updates for network devices 106 included in device networks 102, and provides user devices 110 with recommendations for the software updates for the network devices 106. The recommendation system 108 may recommend software that is tailored according to operational preferences of user accounts or users associated with the device networks 102.

Generally, a user of a user device 110 may operate, maintain, manage, or otherwise be associated with a device network 102 that includes at least network devices 106 that perform various roles when communicating in the device network 102. The device network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network devices 106 may be configured to communicate inside the device network 102, and/or outside the device network 102, using various types of communication protocols over wired and/or wireless connections.

The network devices 106 may include any type of networking device, such as servers, switches, routers, hubs, bridges, gateways, modems, repeaters, access points, etc. Additionally, the network devices 106 may include personal, user devices such as phones, tablets, wearables devices, or other personal computing devices. The network devices 106 may comprise physical nodes (e.g., processors, chipsets, devices, etc.), virtual nodes (virtual machines, containers, etc.), and/or any combination thereof. In some examples, the network devices 106 may be included in one or more physical locations, such as one or more data centers 104. The one or more data centers 104 (or other physical locations) may be physical facilities or buildings located across geographic areas that designated to store networked devices that are part of the device networks 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the network devices 106 in the device networks 102 may not be located in explicitly defined data centers 104, but may be located in other locations or buildings.

The user devices 110 may control, communicate with, or otherwise interact with the network devices in the device networks 102 using their user devices 110 and over one or more networks 112. The network(s) 112 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user devices 110 may comprise any type of computing device through which a user is able to interact with other devices (e.g., phones, tablets, personal computing devices, wearable devices, network devices 106, etc.). In some examples, users of the user devices 110 may have registered accounts with the recommendation system 108 in order to receive recommendations for software to run on their network devices 106. For instance, the recommendation system 108 may be associated with a vendor, producer, or other third-party that offers new software or upgrades for network devices 106 for the users of the user devices 110 to consider for their network devices 106.

In some examples, the users of the user devices 110 may interact with the recommendation system 108 using one or more portals 114. The portal 114 may comprise any means through which the user devices 110 may interact with the recommendation system 108, such as a command line interface (CLI), application programming interface (API), web-based portal, email communication system, and so forth. The users of the user devices 110 may interact with the portal 114 to provide various information, and to consume various information. The users of the user devices 110 may provide input via any type of input mechanism for the user devices 110, such as mechanical input (e.g., mouse, keyboard, touch screen, buttons, capacitive sensor, etc.), voice command input, haptic input, and/or any other input mechanism.

In some examples, the users of the user devices 110 may interact with the portal 114 to provide preferences 116 for their network devices 106. In some instances, the users of the user devices 110 may define one or more device groups for their network devices 106 based on various attributes of the network devices 106. The device groups may be associated with respective device policies that indicate various metadata for the included network devices 106, such as functional attributes of the network device 106, device types, software versions/types, desired features, operational preferences, and so forth. In some examples, the users may determine the device groups for the network device 106 described in more detail in FIG. 2.

The user may provide input data 118 that defines the device groups for the network devices 106. For instance, a device group may be created for all router devices 106, and a different device group may be created for server devices 106 that are running a particular software or are otherwise performing the same/similar functional role. In this way, the device groups may generally group the network devices 106 together that are running the same or similar software for performing a same or similar functional role in the device network 102.

After defining device groups for the network devices 106, the user may provide input data 118 that defines preferences 116 for the device groups. For example, the users may provide preferences 116 such as a risk-tolerance level indicating an allowable measure of risk associated with software running on the network devices 106, a disallowed-operational list indicating security vulnerabilities or software bugs that are disallowed for the network devices 106, a preferred-operational list indicating a set of features that are preferred to be associated with the group of network devices 106, etc. these preferences 116 may be associated with the device policies, and thus device groups, for network devices 106 indicated by the user of the user devices 110. The user device 110 may then send the device policies and associated preferences 116 to the recommendation system 108 for use in monitoring the network devices 106 for the user of the user device 110.

Generally, the recommendation system 108 may receive the input data 118 from the user devices 110, where the input data is from a user and/or user account that is associated with the device networks 102 including the network devices 106 for which the recommendation system 108 is to provide recommendations. The input data 118 may include or indicate a device policy for a group of network devices 106, functional attributes for the group of network devices, preferences 116 for the group of network devices 106, and/or other metadata relevant for the recommendation system 108 to recommend optimized software to run on the group of network devices 106. At least a portion of the input data 118 may be provided to a policy engine 120 configured to generate a device policy 124 based on the functional attributes (or other attributes) of the group of network devices 106. The device police 124 may be generated for groups of network devices based on the network devices 106 having a common functional role in the device network 102, sharing common functional attributes, running the same or similar software, being of a same device type or version, and/or other attributes. In this way, the recommendation system 108 may determine, for multiple network devices 106 at a time, optimized software to run thereon as opposed to moving through each network device 106 in the entire device network 102. The device policies 124 may be utilized to provide recommendations for software or upgrades for groups of network devices 106 that may all, or at least a portion of the devices 106, may benefit from running or upgrading to. Stated otherwise, the recommendation system 108 may use the device policy 124 for the group of network device 106 to bootstrap the recommendation process to run on a group of network devices 106 rather than atomic devices to provide recommendations for network-wide software upgrades or changes.

The input data 118 may be provided to a preference engine 122 which generates operational preferences 126 for the group of network devices 106. The operational preferences 126 may generally comprise constraints and preferences for the software running on the group of network devices 106. For instance, the operational preferences 126 may indicate a risk-tolerance level for software running on the network devices 106, a minimum/maximum release age of the software, a minimum/maximum release popularity, preferred/required software features, software bugs to avoid, security advisories to avoid, and so forth.

In some examples, a software-recommendation engine 128 may associate the operational preferences 126 with the device policy 124 of the group of network devices 106 for which the operational preferences 126 are to be applied. For instance, the software-recommendation engine 128 may store indications of the operational preferences 126 in association with the device policy 124 for the group of network devices 106. In this way, the device policy 124 may indicate functional requirements for software that is determined to run on the group of network devices 106, and also operational preferences 126 for the software that is determined to run on the group of network devices 106.

In some instances, the recommendation system 108 may include a telemetry component 132 configured to collect various types of network-device data 130 from the network devices 106 and/or device networks 102. The network-device data 130 may include any type of data indicative of roles, functions, communications, and/or attributes of the network devices 106. For instance, the network-device data 130 may include telemetry data, configuration data, communication data, and/or other types of data associated with the network devices 106. The telemetry data may indicate, for example, the types of communications being performed by the network devices 106, the types of processes/applications being run by the network devices 106, and/or other data. The configuration data included in the network-device data 130 may indicate software types and/or versions running on the network devices 106, configurations of the network devices 106, features provided by the network devices 106, hardware specifications for the network devices 106 (e.g., models, versions, chipsets, capabilities, vendors, etc.) and so forth. The network-device data 130 may include any type of data that is generally indicative of the functions, configurations, and/or other attributes associated with the network devices 106 and/or device networks 102. The telemetry component 132 may obtain the network-device data 130, and format or analyze the network-device data 130 for consumption by a risk component 134 and a recommendation-trigger component 136.

Generally, the risk component 134 may determine a risk metric 138 (or risk score) that indicates a measure of risk associated with the operating conditions of the group network devices 106 based on the network-device data 130. The risk component 134 may determine the risk metrics 138 as a sum of one or more factors, such as a number of new security vulnerabilities (and severity) that are associated with the current software running on the network devices 106, the number of new open software bugs (and severity) that are associated with the current software, and/or other risk indicators. Risk indicators may include various types of data, such as end-of-life milestones including indications of products and software releases that are running releases that are past end-of-support deadlines or software maintenance deadlines. As noted above, the operational preferences 126 may further include the disallowed-operational list indicating security vulnerabilities or software bugs that are disallowed for the network devices 106, and the preferred-operational list indicating a set of features that are preferred to be associated with the group of network devices 106.

In some examples, the risk component 134 may extract the requirements or constraints from the operational preferences 126 and use them as constraints to drive the optimal software recommendation to select the software which satisfy the higher number of the requirements in the operational preferences 126. In some examples, the recommendation system 108 may utilize Integer Linear Programming (ILP) and a Solver to derive the optimal software recommendation. Further, the recommendation system 108 may include the use of an objective function such that the software-recommendation engine 128 may be able to prefer software types which meet the entered operational preferences 126 or requirements and penalize the software types which do not.

In some examples, the recommendation system 108 may use the concept of shadow variables and penalties. Generally, the recommendation system 108 may evaluate a particular software solution using an objective function which measures the difference between Reward Score (A) and Risk Score (A) of the particular software solution. The rewards score may be computed as a weighted sum of several factors, such as a number of current security vulnerabilities (and corresponding severity) that would be successfully closed when upgrading from current to the new software solution A. The recommendation system 108 can use different weights, W_SAL, W_SAM and W_SAH, to account for different level of reward in successfully closing a low, medium or high severity Security Advisory (SA). Further, the recommendation system 108 may compute the rewards score using, as an example, a number of current open software bugs (and corresponding severity) that would be successfully closed when upgrading from current to the new solution A. The recommendation system 108 can use different weights, W_BL, W_BM and W_BH, to account for different level of reward in successfully closing a low, medium or high severity Software Bug (B).

Further, the recommendation system 108 may compute risk scores using a weighted sum of several factors, such as a number of new security vulnerabilities (and severity) that are associated with the new software A. The recommendation system 108 may use here as well the same weights W_PL, W_PM and W_PH as defined per reward. Further, the recommendation system 108 may use the number of new open software bugs (and severity) that are associated with the new solution A, and similarly use here as well the same weights W_BL, W_BM and W_BH as defined per reward.

The recommendation system 108 may use a less complex approach to account for the operational requirements, such as by assessing software solutions that both meet the risk profile requirements (e.g., conservative to aggressive) and satisfy the operational preferences (disallowed-operational list and preferred-operational list).

In some examples, the recommendation system 108 may further use shadow variables where a shadow variable B(A, P) is an extra term which is added to the objective function and takes a large number value (usually 100× greater than max value of the objective function) if and only if software A meets the criteria specified in X, while is set to 0 otherwise. In this case, software A is the solution that is evaluated, and P is the operational risk metric selected by the user.

As an example, consider a user A which has set an operational risk-tolerance level to a conservative value. The search for the best recommendation software A, based on a defined objective function F(.), can be modeled as below (Linear Programming):

Max_{$A$ in Search Space}$F(A)$ subject to:
/* Constraints from the Conservative Profile */Release Age($A$)>=$TA\_H$ for all $A$ in Search Space Release Popularity($A$)>=$TP\_H$ for all $A$ in Search Space By using the Shadow Variable, the LP formulation above can be relaxed in the below for:

Max_{$A$ in Moderate/Conservative}$F(A)+B(A,$Conservative$)$ where B(A, Conservative) is the shadow variable for profile Conservative. Notice how the relaxed formulation, enables:

Max_{$A$ in Moderate/Conservative}$F(A)+B(A,$Conservative$)$ where B(A, Conservative) is the shadow variable for profile Conservative. Notice how the relaxed formulation, enables:

A higher value of the overall objective function F(A)+B (A, Conservative) for software solutions A which belong to the profile set by the user (Conservative). Remember that B(A, Conservative) will be activated for solutions A in the feasible space Conservative and this translated to a higher value compared to other solutions outside the Conservative feasible space; and Relaxation of the Search Space—from Conservative to Moderate/Conservative—allowing other solutions in close proximity to Conservative to be explored as well, hence relaxing the search around Conservative (higher chance to find a good solution that a user may still adopt in Moderate/Conservative even though the user has chosen Conservative).

Further, it follows that:

Max_{A in Moderate/Conservative}F(A)+B(A,Conservative)

where B(A, Conservative) is the shadow variable for profile Conservative. Notice how the relaxed formulation, enables:

A much higher value of the overall objective function F(A)+B(A, Conservative) for solutions A which belong to the profile set by the user (Conservative). Remember that B(A, Conservative) will be activated for solutions A in the feasible space Conservative and this translated to a 100× higher value compared to other solutions outside the Conservative feasible space; and Relaxation of the Search Space—from Conservative to Moderate/Conservative—allowing other solutions in close proximity to Conservative to be explored as well, hence relaxing the search around Conservative (higher chance to find a good solution that user may still adopt in Moderate/Conservative even though the user has chosen Conservative).

To account for the user operational preferences 126 (disallowed-operational list and preferred-operational list), the recommendation system 108 may utilize the concept of PENALTY in the objective function. For instance, the objective function F(.) may use the weights W=[W_BL, W_BM, W_BH] to score the reward/risk of open bugs with severity Low, Medium and High. Hence it can be written as below:

F(A|Bugs,W)=Rewards(Current→A|Bugs,W)−Risk(Current→A|Bugs,W)

When using a Penalty for Bugs, the Bugs list will be split into two sets Bugs={[Bugs to Avoid], [Bugs Ok]]. The Bugs in [Bugs Ok] will be weighted using the same weights W; conversely, the bugs in [Bugs to Avoid] will use the amplified weights W×P. Hence, the above equation can be written as:

F(A|Bugs,(W,P))=Rewards(Current→A|{[Bugs Ok], W},{[Bugs to Avoid],P)−Risk(Current→A|{[Bugs Ok],W},{[Bugs to Avoid],P)

As illustrated, the concept of Penalty presented for bugs (but generally applicable to any operational preferences 126), may allow the software-recommendation engine 128 to search for an optimized software solution while factoring in the specific needs of the operational preferences 126 of the user. To summarize, the use of Penalty weights may allow (i) the objective function to reward or penalize solutions based on specified operational preferences 126 set by the user, or software solutions which fully satisfy operational preferences 126 will have higher values of the objective functions compared to others which partially satisfy, and (ii) select the one solution out of the partially satisfy solutions which meets the highest number of the operational preferences 126. In various examples, multiple software solutions may be surfaced for recommendations, and may be ranked based on risk, such that the user may select a software solution after evaluating exposed bugs and advisories/vulnerabilities.

It should be appreciated that the above-described functions and description for identifying optimized or recommended software solutions for running on network devices 106 according to operational preferences 126 is merely illustrated, and any technique known in the art may be utilized.

In this way, the recommendation system 108 (e.g., risk component 134, software-recommendation engine 128, etc.) may determine optimized software solutions to run on the network devices 106. Generally, the optimized software solutions may perform the functional roles or attributes of the group of network devices 106, and may be optimized based on satisfying the operational preferences 126 with higher levels of accuracy from among the plurality of software available.

In some examples, the recommendation-trigger component 136 may be provided with the risk metrics 138 that indicate a measure of risk for the software currently running on the network devices 106. If the risk metrics 138 violate a default threshold, and/or a risk-tolerance threshold indicated in the operational preferences 126, the recommendation-trigger component 136 may trigger 140 the software-recommendation engine 128 to determine optimized software solutions for running on the network devices 106 based on the functional attributes/roles, the operational preferences 126, and/or other parameters or constraints. However, in some examples the recommendation-trigger component 136 may cause the trigger 140 to occur upon a user of a user device 110 explicitly requesting a new recommendation of a software solution, periodically, according to a predefined schedule, upon network devices 106 being detected as entering or leaving the device network 102, and/or for other reasons.

After determining optimized or recommended software solutions for the network devices 106, the software-recommendation engine 128 may output recommendation data 142 for access by the user device 110 to view and apply. As illustrated, a portal 114 may be utilized to view software recommendations 144 included in the recommendation data 142, as well as additional data associated with the software recommendations 144 (e.g., a number of software bugs, security advisories, and/or security vulnerabilities known for the software solution). Additional detail of the display of the recommendation data 142 on the user devices 110 is found with respect to FIG. 4 below.

In some examples, the recommendation system 108 may include a compliance engine 129 configured to determine the deployment status of accepted recommended/optimal software, indicate non-compliance of the recommended software running on the network devices 106, and/or indicate compliance of the recommended software running on the network devices 106. For instance, the recommendation data 142 may include, for each software recommendation 144, indications of risk, security vulnerabilities/advisories, etc., for the user of the user device 110 to consider. The user may provide input indicating they would like to accept and deploy one of the software recommendations 144, and the recommendation system 108 may cause (e.g., instruct another system(s)) to deploy the selected, recommended software on the network devices 106. Over time, the telemetry component 132 may collect or obtain network-device data 130, such as telemetry data, and provide the data to the compliance engine 129. The compliance engine 129 may analyze the network-device data 130 indicating performance of the selected software recommendation 144. The compliance engine 129 may be configured to determine the deployment status of the recommended/optimal software (e.g., has the software been fully deployed, stage of the deployment process, etc.) and output an indication of the deployment status to the user device 110. Further, the compliance engine 129 may indicate whether the software upgrade is non-compliant to the accepted release (e.g., whether the software upgrade is performing as recommended). Similarly, the compliance engine 129 may determine, using the network-device data 130, whether the software upgrade is compliant with, or matches to, to the accepted release as recommended to the user.

The techniques described herein, the term software generally includes software, software upgrades, software versions (or software "releases"), software solutions, firmware, operating systems, patches, applications, scripts, processes, and/or any other type of computer-executable code that may be run by processor(s) of the network devices 106. Generally, the software may, at least partially, enable the network devices 106 to perform one or more functions in the device networks 102.

As described herein, the recommendation system 108 may include one or more computing devices (e.g., a single device, multiple devices, network(s) of devices, etc.) comprising one or more processors configured to execute various computer-executable instructions. Additionally, the recommendation system 108 may include components, modules, etc., that are stored on non-transitory computer-readable media and configured to perform the techniques and operations described herein as being performed by the recommendation system 108. For instance, the recommendation system 108 may include the policy engine 120, the preferences engine 122, software-recommendation engine 128, the compliance engine 129, telemetry component 132, risk component 134, recommendation-trigger component 136, and/or any other number or arrangement of components. The components described herein are merely illustrative, and any number or configuration of components may be utilized to perform the techniques described herein.

Figure 2:
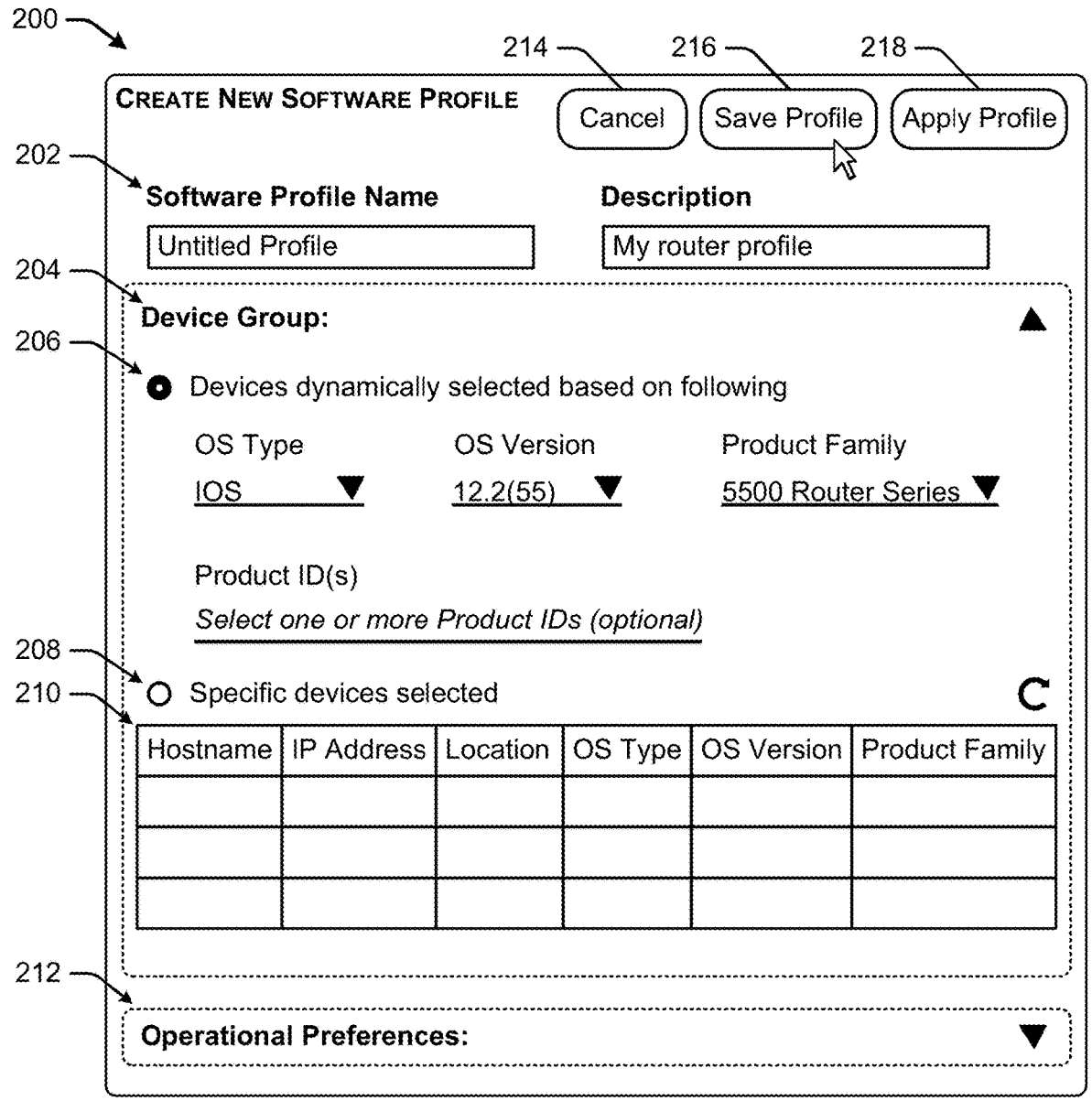
FIG. 2 illustrates an example of a user interface configured to receive input from a user to define a device policy for a group of network devices included in a device network.

FIG. 2 illustrates an example of a user interface (UI) 200 configured to receive input from a user to define a device policy for a group of network devices included in a device network 102. The UI 200 may be presented on a display of a user device 110, such as through a portal 114 (e.g., web-based portal, email portal, etc.).

The UI 200 may be utilized to create a new software profile for a group of network devices 106. In some examples, a software profile may comprise a device profile and include a device group as well as operational preferences 126 for the group of network devices 106. As illustrated, a user of the user device 110 may input a software profile name 202 for their software profile as well as a description (e.g., a profile for routers). The user may further input information indicating the device group 204, such as by selecting between dynamically selecting devices option 206 and/or a specific devices selected option 208. The option 206 may allow users to dynamically select network devices 106 to be included in the device group based on various functional attributes or characteristics, such as software type (e.g., OS Type), Software Version (e.g., OS Version), device Product Family/product ID (e.g., network device hardware) and so forth. Additionally, the user may be able to simply input product ID(s) for network devices 106 that are to be included in the device group of network devices 106. Generally, the data input into the UI 200 may represent existing hardware and/or software features, and may alternatively be determined by analyzing telemetry data from the network device 106 as opposed to explicit user input.

Additionally, or alternatively, the user may be able to select an option 208 for viewing the specified devices selected by placing device information in a table 210, such as network devices 106 that the user has indicated as being included in the device group. In some examples, the recommendation system 108 may analyze the network-device data 130 to determine which network devices 106 are to be included in the device group 204. For instance, the network-device data 130 may be utilized to determine OS Type, OS Version, Product Family, and/or other attributes of the network devices 106 that indicate their inclusion in the device group 204.

After identifying the network devices 106 to be included in the device group 204, the user may determine they want to cancel the creation of the software profile (or device policy) and select option 214, save the profile and select option 216, and/or apply the profile and select option 218. In this way, a user may utilize a user device 110 and a portal 114 that presents the UI 200 to indicate a device group 204 of network devices 106 that are to be included in a new software profile (e.g., device policy). Subsequent to selecting apply profile option 216, the information input via the UI 200 may be provided as input data 118 to the policy engine 120 to generate the device policy 124.

It should be understood that UI 200 is merely illustrative, and any other type of UI or data entry mechanism may be used to create the device groups of network devices 106 for which software is to be recommended as a whole.

Figure 3:
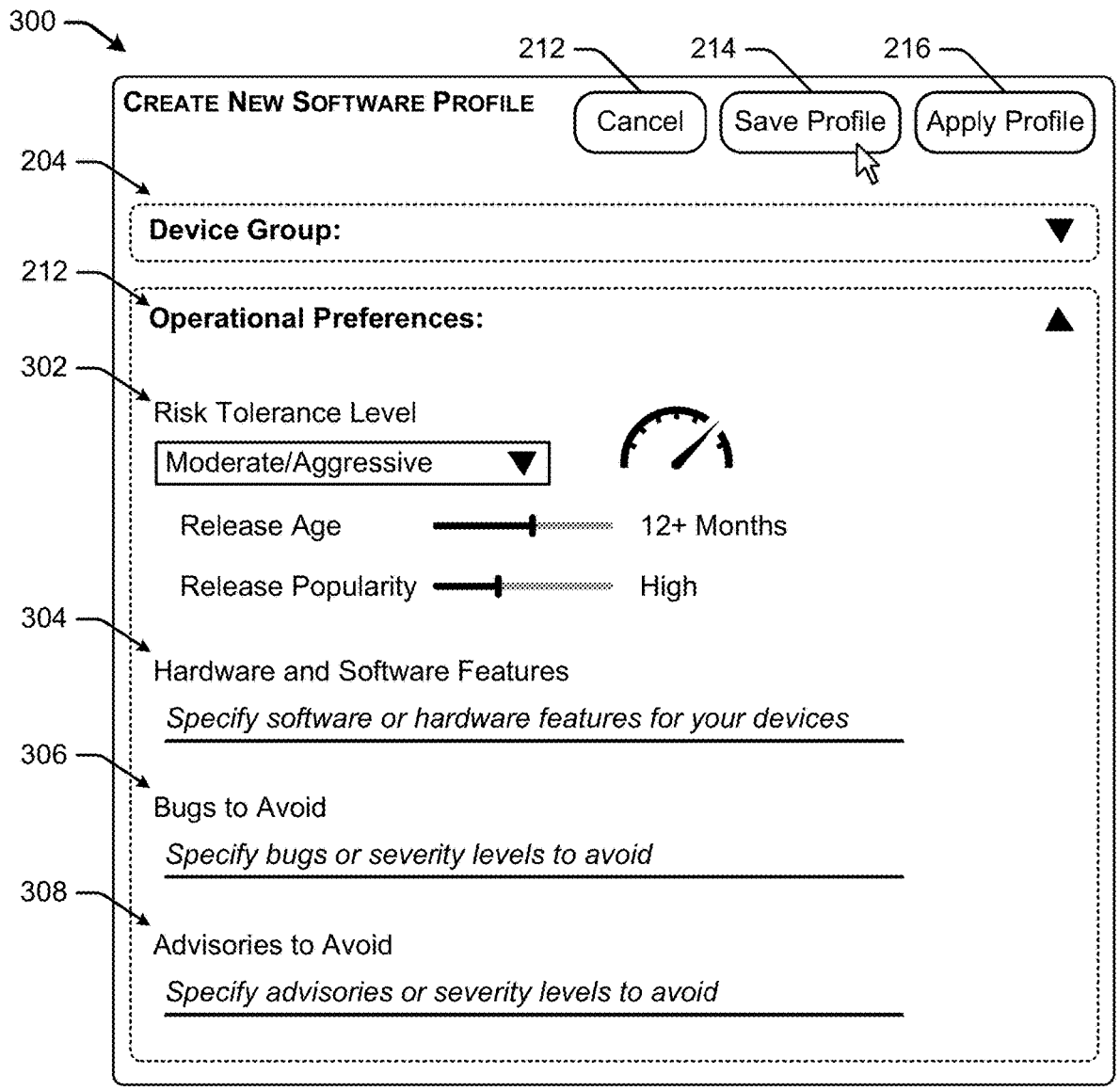
FIG. 3 illustrates an example of a user interface configured to receive input from a user to define operational preferences for a device policy associated with a group of network devices included in a device network.

FIG. 3 illustrates an example of a user interface 300 configured to receive input from a user to define operational preferences 126 for a device policy associated with a group of network devices 106 included in a device network 102.

As shown, the user may have selected the operational preferences option 212 to provide input data 118 that defines the operational preferences 126. As shown, the user may input a risk tolerance level 302 which indicates a profile or level for a measure of risk that the user would like to apply when determining software upgrades for their network devices 106. The risk tolerance level 302 is illustrated as moderate/aggressive, and other default profiles may be utilized (e.g., low risk, moderate risk, etc.). Further, the user may provide input regarding a minimum amount of time a software version must be released until it may be recommended for the network devices 106 (e.g., to help ensure that bugs and advisories/vulnerabilities have been discovered and fixed), and may also provide input specifying a release popularity that software must have before being recommended for the network devices 106 (e.g., wait until use of the software by other users and/or on other devices has reached a threshold popularity until applying it to network devices 106 to ensure that other users are satisfied with using the software).

The user may further be provided with an option 304 to specify hardware and software features for the network devices 106, such as preferred-operational lists of preferred features, and/or existing, as well as future, software and/or hardware features to ensure that recommended software continues the enablement of the existing and future software and/or hardware features. Further, the user may be provided with options 306 and 308 to specify software bugs to avoid and security advisories/vulnerabilities to avoid for their network devices 106 (e.g., disallowed-operational list).

After specifying data in the operational preferences 212 portion of the UI 300, the user may determine to select options 212, 214, and/or 216 to cancel the software profile, save the software profile, and/or apply the software profile, respectively. If the user selected the apply profile option 216, the user device 110 may send at least the data entered via the operational preferences interface 212 as input data 118 to the preference engine 122. The preference engine may then determine the operational preferences 126 which are provided to the software-recommendation engine 128.

It should be understood that UI 300 is merely illustrative, and any other type of UI or data entry mechanism may be used to create the operational preferences 126 for the group of network devices 106 of the device for which software is to be recommended as a whole.

Figure 4:
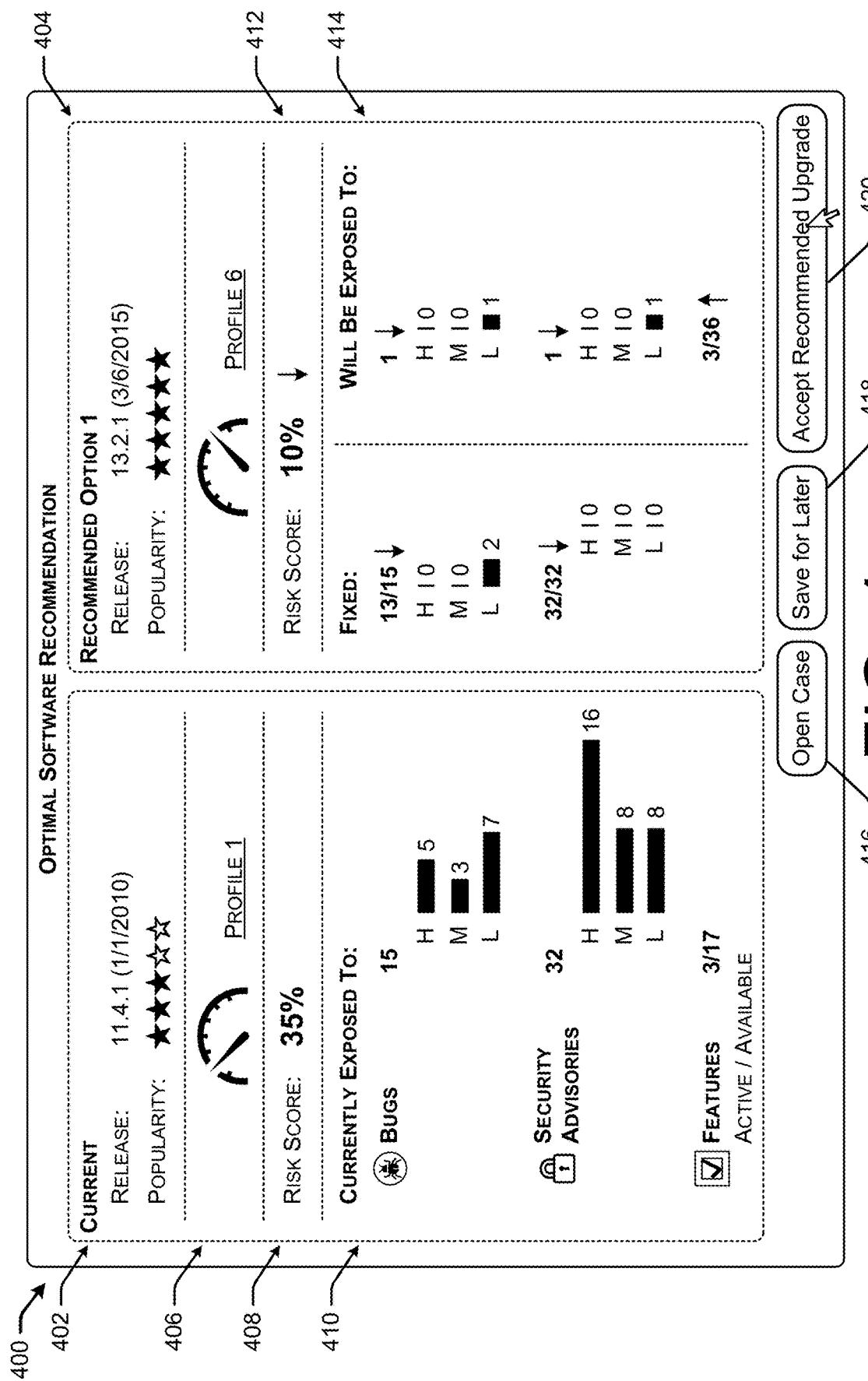
FIG. 4 illustrates an example of a user interface configured to present current operating conditions for a network device running current software and predicted operating conditions for the network device running recommended software.

FIG. 4 illustrates an example of a user interface 400 configured to present current operating conditions for a network device 106 running current software and predicted operating conditions for the network device 106 running recommended software. The UI 400 may be presented on a display of the user device 110 of a user, such as via the portal 114 as software recommendations 144. For instance, the recommendation data 142 may be rendered via the display of the user device 110 in the UI 400.

As illustrated, the UI 400 may include a current area 402 which depicts current operating conditions of at least one network device 106, and a recommended option area 404 that depicts operating conditions of the network device 106 using a recommended software. Although the UI 400 depicts a single recommended option, in some examples, multiple recommended options may be presented for a user to consider for software upgrades for their network devices 106. In examples where there are multiple recommended options, the recommended options may be ranked based on how optimal they are for running on the network devices 106, such as based on risk score. In this way, the user may consider multiple, recommended software upgrades, and may also be apprised as to which may be ranked higher based on various metrics, such as risk scores, availability and unavailability of hardware/software features, and/or other metrics.

The current area 402 may include an indication of the software release date and/or version, along with an indication of a popularity of the current software (e.g., 3 stars). The current area 402 may further include an indication of a risk score or metric 408 (e.g., 35% risk) associated with the current software. Additionally, the current area 402 may include a currently exposed to area 410 that includes indications of bugs, security advisories, and features that the software is exposed to and/or operating with under the current operating conditions. As illustrated, the software running on the network device 106 is exposed to 15 bugs or various risk levels and 32 security advisories of various levels, and is supporting 3 active features out of 17 available features for the network device 106.

The recommended option area 404 similarly includes a risk score area 412 that indicates the risk score for the recommended software running on the network device 106 would be 10%, as opposed to the current score of 35% for the current software. The risk score area 412 may, in examples where multiple recommended software options are presented, display multiple risk scores for the multiple recommended software options for comparison for the user. Further, the recommended option area 404 may include a fixed/exposed to area 414 that indicates a number of bugs and security advisories that will be fixed compared to the current software, and further indicates that the network device 106 would have 3 active features out of an available 36 features. As shown, the recommended software (option 1) may fix 13/15 existing bugs, and may fix 32/32 existing security advisories. Further, the recommended software option may only be exposed to one software bug, and one software vulnerability. Further, the recommended software may provide 36 available features, rather than only 17 provided by the current software. Additionally, in examples where multiple recommended options 404 are presented to a user, the presentation of the fixed-exposed area for each of the recommended software options 404 may be helpful for the user to evaluate and compare the different recommended options 404. In this way, the user may make an informed decision as to which recommended option 404 to accept for use on their network devices 106.

As illustrated, the UI 400 may include selectable options 416, 418, ad 420, which correspond to an open case option, a save for later option, and accept recommend upgrade option, respectively. Upon the user selecting the accept recommended upgrade option 420, the user device 110 may send an indication to the recommendation system 108 that the user would like to apply the recommended software. The recommendation system 108 may then perform operations to cause the group of network devices 106 to install and run the recommended software. In some examples, however, the user may deny the recommended software option presented and continue with the current software running on the group of network devices 106. In some instance, the device policy may be used to determine that multiple network devices 106 in the group of network devices 106 should all run the recommended software. In this way, the recommendation may not simply be atomic to one network device 106, but be equally applied to a group of network devices 106 for scalability in a device network 102.

Although not illustrated, the UI 400 and/or another UI may be utilized to present information for tracking compliance of the selected, recommended software option over time. For instance, the user may select one of the recommended options 404, and the recommendation system 108 may collect or obtain telemetry data indicating performance and/or other attributes of the network devices 106 running the recommended software option. The compliance engine 129 of the recommendation system 108 may determine how well the network devices 106 are performing using the recommended software option as compared to the optimal version. For instance, the compliance engine 129 may track the software bugs and/or security advisories/vulnerabilities to which the network devices 106 are exposed, the risk metric for the network devices 106 running the recommended software option, the software and/or hardware features provided by the network devices 106 running the recommended software option, and/or other data indicative of compliance of the recommended software option to the optimal version.

It should be understood that UI 400 is merely illustrative, and any other type of UI or data entry mechanism may be used to view the operating conditions of the current software running on network devices 106, view the optimizations provided by the recommended software option, and provide an option to automate installation of the recommended software on the group of network devices 106.

The UIs 200, 300, and 400 may be populated by data, or otherwise render data, generated at least partly by the recommendation system 108 and sent to the user device 110.

Figure 5:
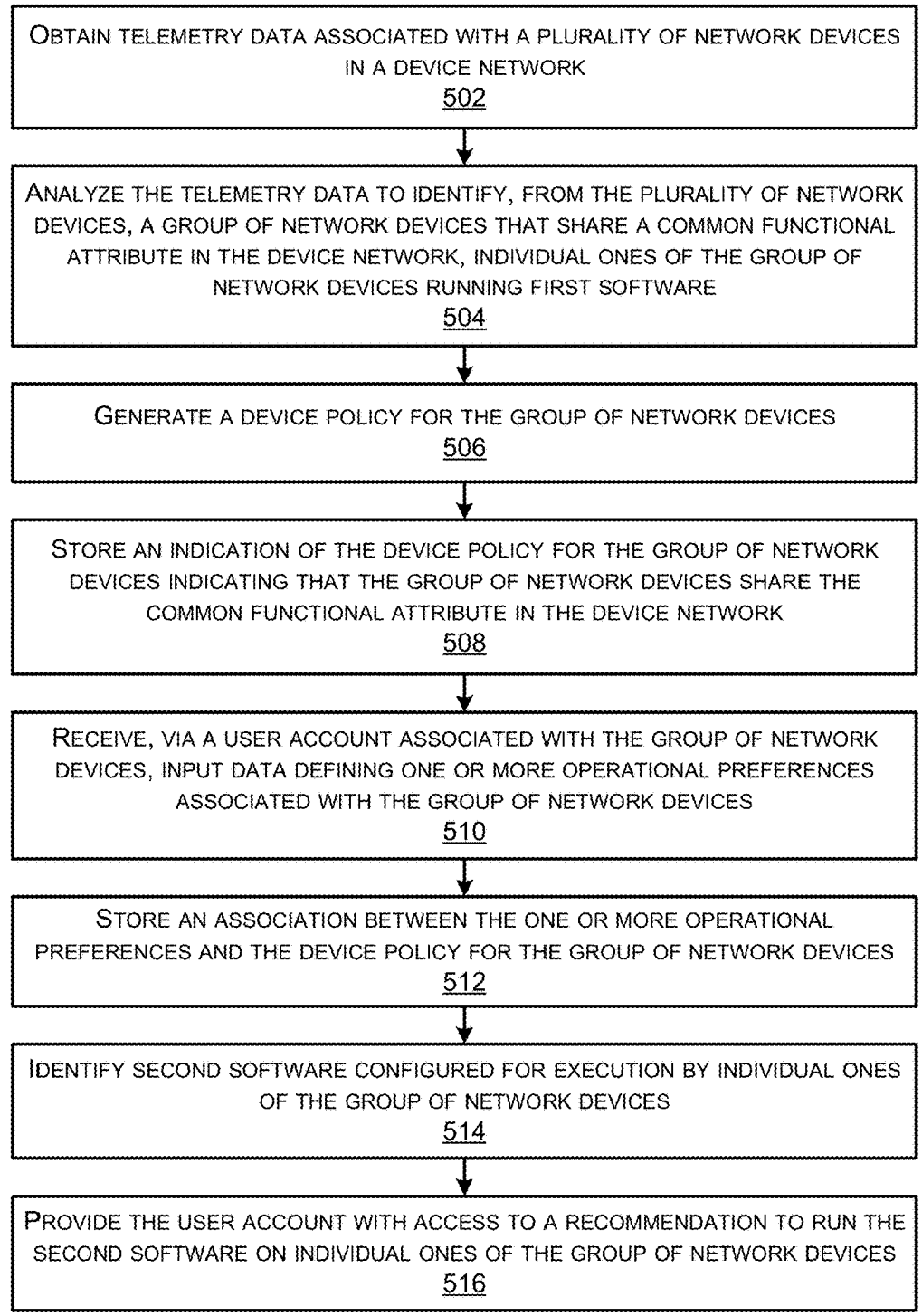
FIG. 5 illustrates a flow diagram of an example method for generating a device policy for a group of network devices that share a common functional attribute, and storing an association between the device policy and operational preferences for the group of network devices.

FIGS. 5 and 6 illustrate flow diagrams of example methods 500 and 600 that illustrate aspects of the functions performed at least partly by device(s) included in the recommendation system 108 as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for generating a device policy for a group of network devices that share a common functional attribute, and storing an association between the device policy and operational preferences for the group of network devices. In some examples, method 500 may be performed by a system comprising one or more processors and one or more non-transitory computer-readable media storing computer-executable instructions that, when executed by the one or more processors, cause the one or more processors to perform the steps of method 500. In some instances, the system may include the recommendation system 108 described herein.

At 502, the recommendation system 108 may obtain telemetry data (e.g., network-device data 130) associated with a plurality of network devices 106 in a device network 102.

At 504, the recommendation system 108 may analyze the telemetry data to identify, from the plurality of network devices 106, a group of network devices 106 that share a common functional attribute in the device network 102. In some examples, individual ones of the group of network devices are running first software.

At 506, the recommendation system 108 may generate a device policy for the group of network devices 106, and at 508, the recommendation system 108 may store an indication of the device policy for the group of network devices 106 indicating that the group of network devices 106 share the common functional attribute in the device network 102.

At 510, the recommendation system 108 may receive, via a user account associated with the group of network devices 106, input data 118 defining one or more operational preferences 126 associated with the group of network devices 106.

At 512, the recommendation system 108 may store an association between the one or more operational preferences 126 and the device policy 124 for the group of network devices 106. At 514, the recommendation system 108 may identify second software configured for execution by individual ones of the group of network devices 106. In some examples, the second software satisfies the one or more operational preferences 126 and is associated with the common functional attribute of the group of network devices 106.

At 516, the recommendation system 108 may provide the user account with access to a recommendation 142 to run the second software on individual ones of the group of network devices 106. In some examples, the recommendation 142 may include a recommendation for multiple second software that are optimized for the network devices 106. In such examples, the multiple second software may be ordered in a ranked list based on, for example, risk score, hardware/software features provided, and/or other metrics.

In some examples, the method 500 may further include collecting operational data that indicates a current operating condition associated with the group of network devices running the first software. Further, the method 500 may include determining, based at least in part on the operating condition, a risk metric indicating a measure of risk associated with the group of network devices running the first software. Even further, the recommendation system 108 may determine that the risk metric violates the one or more operational preferences.

In some instances, the recommendation 142 to run the second software on individual ones of the group of network devices 106 includes indications of software bugs or security vulnerabilities for the second software.

FIG. 6 illustrates a flow diagram of an example method for evaluating current operating conditions of a network device running first software against operational preferences for that network device, and providing a user device with a recommendation to run second software.

At 602, the recommendation system 108 may identify a group of network devices 106 in a device network 102 that share a common functional attribute, wherein individual ones of the group of network devices 106 are running first software. In some examples, the recommendation system 108 may identify the group of network devices 106 by analyzing network-device data 130, and/or by receiving explicit user input data 118 indicating device identifiers for individual ones of the group of network devices 106.

At 604, the recommendation system 108 may receive, from a user account and via a user device 110, input data 118 defining one or more operational preferences 126 associated with the group of network devices 106. At 606, the recommendation system 108 may collect operational data (e.g., network-device data 130) that indicates a current operating condition associated with the group of network devices 106 running the first software.

At 608, the recommendation system 108 may determine, based at least in part on the operating condition, a risk metric 138 indicating a measure of risk associated with the group of network devices 106 running the first software. At 610, the recommendation system 108 may determine that the risk metric 138 violates the one or more operational preferences 126.

At 612, the recommendation system 108 may identify second software configured for execution by individual ones of the group of network devices 106. In some examples, the second software satisfies the one or more operational preferences 126 (e.g., above the risk-tolerance threshold) and is associated with the common functional attribute of the group of network devices 106.

At 614, the recommendation system 108 may provide the user device 110 with access to a recommendation 142 to run the second software on individual ones of the group of network devices 106.

In some examples, the method 600 may further include the recommendation system 108 storing an association between the one or more operations preferences 126 and a user account associated with the group of network devices 106.

In some instance, the one or more operational preferences 126 are associated with a user account and comprise at least one of a risk-tolerance level indicating an allowable measure of risk associated with the group of network devices 106, a disallowed-operational list indicating at least one of security vulnerabilities or software bugs that are disallowed in the group of network devices, and/or a preferred-operational list indicating a set of features that are preferred to be associated with the group of network devices 106.

In some examples, the method 600 may include additional steps for evaluating the performance of the group of network devices 106 after running the second software. For instance, the recommendation system 108 may receive input from a user account associated with the group of network devices 106 indicating acceptance of the recommendation to run the second software on individual ones of the group of network devices 106. Further, the recommendation system 108 may track, such as by collecting and analyzing telemetry data, a deployment status of the second software (e.g., accepted release) as the user upgrades their group of network devices 106 from running the first software to running the second software. Even further, within a user interface that presents a software policy view, the recommendation system 108 may provide information indicative of whether the second software corresponds to an optimal release for the group of devices 106 and that the deployment of the second software is complete.

Figure 7:
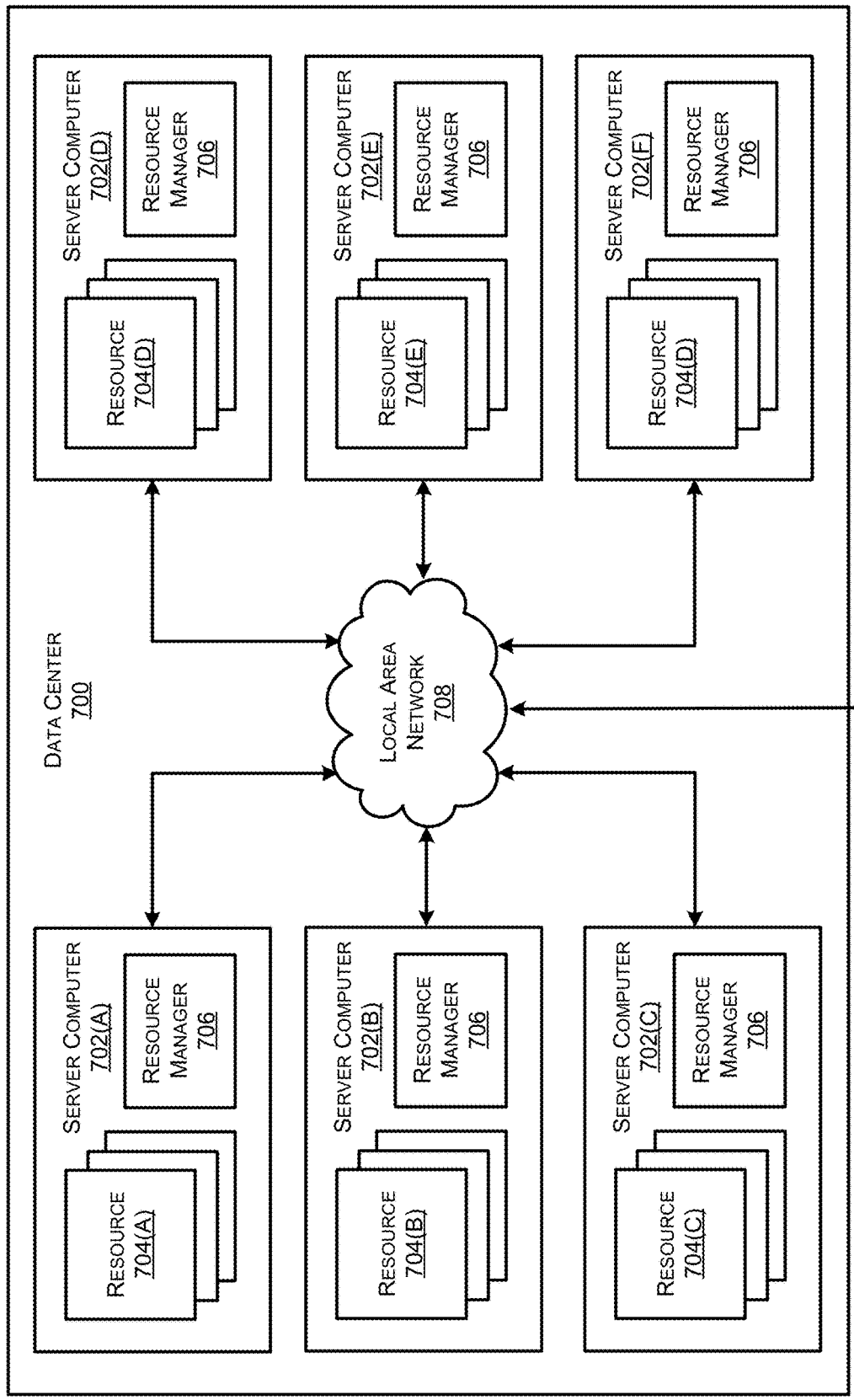
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any of the network devices 106 described herein and/or devices included in the recommendation system 108. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized. In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations.

Figure 8:
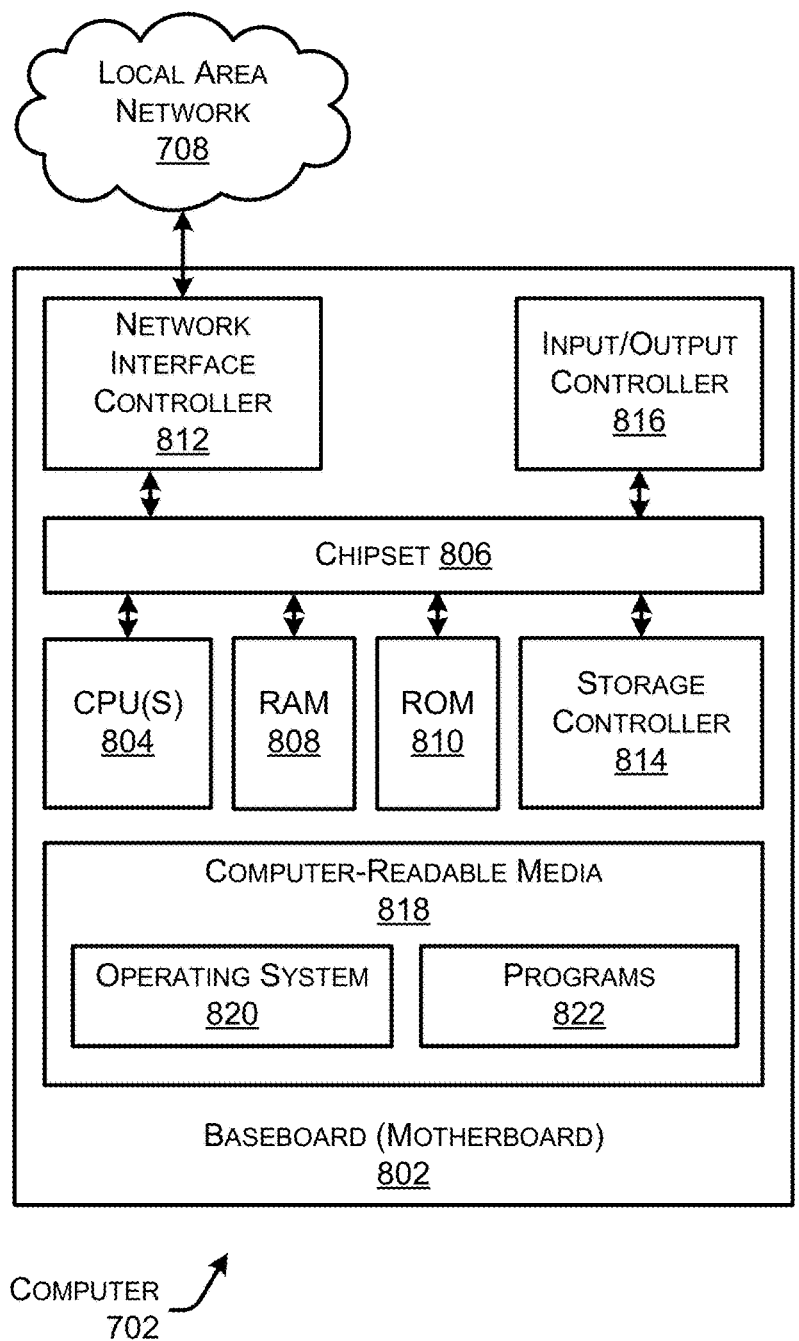
FIG. 8 is a computer architecture diagram showing an illustrative computer hardware architecture for implementing a server device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server 106 described herein, and may comprise networked devices such as servers, switches, routers, hubs, bridges, gateways, modems, repeaters, access points, etc.

The server computer 702 may correspond to any of the network devices 106 described herein. In some examples, the server computer 702 may be configured to perform, potentially in conjunction with other server computers, the operations of the recommendation system 108 and/or be included in the recommendation system 108.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (and/or 102). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702.

In some examples, the operations performed by the recommendation system 108, and or any components included therein, may be supported by one or more devices similar to computer 702. Stated otherwise, some or all of the operations performed by the recommendation system 108, and or any components included therein, may be performed by one or more computer devices 702 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise any of the network devices 106 described herein. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the network devices 106, recommendation system 108, etc. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure performed by the network devices 106 and/or the recommendation system 108. For instance, the programs 822 may cause the computer 702 to perform techniques for determining recommended software to run on network devices 106.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to:
identify a first group of network devices in a device network that share a first common functional attribute, and a second group of network devices in the device network that share a second common functional attribute, wherein individual ones of the first group of network devices and the second group of network devices are running first software;
receive, from a user account and via a user device, input data defining first operational preferences associated with the first group of network devices;
receive, from the user account and via the user device, input data defining second operational preferences associated with the second group of network devices;
collect operational data that indicates a first current operating condition associated with the first group of network devices and a second current operating condition associated with the second group of network devices running the first software;
determine, based at least in part on the first current operating condition, a first risk metric indicating a first measure of risk associated with the first group of network devices running the first software;
determine, based at least in part on the second current operating condition, a second risk metric indicating a second measure of risk associated with the second group of network devices running the first software;
determine that the first risk metric violates the first operational preferences;
determine that the second risk metric does not violate the second operational preferences;
identify second software configured for execution by individual ones of the first group of network devices, wherein the second software satisfies the first operational preferences and is associated with the first common functional attribute of the first group of network devices;
determine that running the second software lowers the first measure of risk associated with the first group of network devices as compared to running the first software;
provide the user device with access to a first recommendation to run the second software on individual ones of the first group of network devices, and a second recommendation to continue to run the first software on the second group of network devices; and
cause the first group of network devices to run the second software.

2. The system of claim 1, comprising further computer-executable instructions that, when executed by the one or more processors, cause the one or more processors to:
store an association between the first operational preferences associated with the first group of network devices and the second operational preferences associated with the second group of network devices, with the user account.

3. The system of claim 1, wherein:
to determine that the first risk metric violates the first operational preferences comprises to determine that the first risk metric indicates a higher measure of risk than an allowable measure of risk.

4. The system of claim 1, comprising further computer-executable instructions that, when executed by the one or more processors, cause the one or more processors to:
obtain telemetry data associated with a plurality of network devices in the device network;
analyze the telemetry data to identify, from the plurality of network devices, the first group of network devices as sharing the first common functional attribute in the device network, and the second group of network devices as sharing the second common functional attribute in the device network;

generate a first device policy for the first group of network devices;
generate a second device policy for the second group of network devices;
store an indication of the first device policy for the first group of network devices indicating that the first group of network devices share the first common functional attribute in the device network; and
store an indication of the second device policy for the second group of network devices indicating that the second group of network devices share the second common functional attribute in the device network.

5. The system of claim 1, wherein a common functional attribute shared by a group of network devices comprises at least one of:
a common hardware component type;
a common functional role in the device network;
a common software version; or
common software features being supported.

6. The system of claim 1, wherein the first operational preferences include a popularity-preference metric indicating a permitted measure of other user accounts associated with other network devices that are running other software, comprising further computer-executable instructions that, when executed by the one or more processors, cause the one or more processors to:
determine that the second software is associated with a popularity metric indicating an actual measure of other users associated with the other network devices that are running the second software; and
determine that the popularity metric is greater than or equal to the popularity-preference metric.

7. The system of claim 1, wherein the first operational preferences include a stability-preference metric indicating a permitted measure of at least one of software bugs, security advisories, or security vulnerabilities determined for other software, comprising further computer-executable instructions that, when executed by the one or more processors, cause the one or more processors to:
determine that the second software is associated with a stability metric indicating an actual measure of at least one of software bugs, security advisories, or security vulnerabilities determined for the second software; and
determine that the stability metric is less than or equal to the stability-preference metric.

8. The system of claim 1, wherein operational preferences comprise at least one of:
a risk-tolerance level indicating an allowable measure of risk associated with a predefined group of network devices;
a disallowed-operational list indicating at least one of security vulnerabilities or software bugs that are disallowed in the predefined group of network devices;
a preferred-operational list indicating a set of features that are preferred to be associated with the predefined group of network devices.

9. A method comprising:
identifying a first group of network devices in a first device network that share a common functional attribute, wherein individual ones of the first group of network devices are running first software;
identifying a second group of network devices in a second device network that share the common functional attribute, wherein individual ones of the second group of network devices are running the first software;
receiving, from a first user account and via a first user device, input data defining first operational preferences associated with the first group of network devices;
receiving, from a second user account and via a second user device, input data defining second operational preferences associated with the second group of network devices;
collecting operational data that indicates a first current operating condition associated with the first group of network devices and a second current operating condition associated with the second group of network devices running the first software;
determining, based at least in part on the first current operating condition, a first risk metric indicating a first measure of risk associated with the first group of network devices running the first software;
determining, based at least in part on the second current operating condition, a second risk metric indicating a second measure of risk associated with the second group of network devices running the first software;
determining that the first risk metric violates the first operational preferences;
determining that the second risk metric does not violate the second operational preferences;
identifying second software configured for execution by individual ones of the first group of network devices, wherein the second software satisfies the first operational preferences and is associated with the common functional attribute of the first group of network devices;
determining that running the second software lowers the first measure of risk associated with the first group of network devices as compared to running the first software;
providing the first user device with access to a first recommendation to run the second software on individual ones of the first group of network devices;
providing the second user device with access to a second recommendation to continue running the first software on individual ones of the second group of network devices; and
causing the first group of network devices to run the second software.

10. The method of claim 9, further comprising:
storing a first association between the first operational preferences and the first user account associated with the first group of network devices; and
storing a second association between the second operational preferences and the second user account associated with the second group of network devices.

11. The method of claim 9, wherein:
determining that the first risk metric violates the first operational preferences comprises determining that the first risk metric indicates a higher measure of risk than an allowable measure of risk.

12. The method of claim 9, further comprising:
obtaining first telemetry data associated with a first plurality of network devices in the first device network;
obtaining second telemetry data associated with a second plurality of network devices in the second device network;
analyzing the first telemetry data to identify, from the first plurality of network devices, the first group of network devices as sharing the common functional attribute in the first device network;
analyzing the first telemetry data to identify, from the second plurality of network devices, the second group of network devices as sharing the common functional attribute in the second device network;
generating a first device policy for the first group of network devices;
generating a second device policy for the second group of network devices;
storing an indication of the first device policy for the first group of network devices indicating that the first group of network devices share the common functional attribute in the first device network; and
storing an indication of the second device policy for the second group of network devices indicating that the second group of network devices share the common functional attribute in the second device network.

13. The method of claim 9, wherein the common functional attribute shared by the first group of network devices and the second group of network devices comprises at least one of:
a common hardware component type;
a common functional role in the first device network and the second device network;
a common software version; or
common software features being supported.

14. The method of claim 9, wherein the first operational preferences include a popularity-preference metric indicating a permitted measure of other user accounts associated with other network devices that are running other software, further comprising:
determining that the second software is associated with a popularity metric indicating an actual measure of other users associated with the other network devices that are running the second software; and
determining that the popularity metric is greater than or equal to the popularity-preference metric.

15. The method of claim 9, wherein the first operational preferences include a stability-preference metric indicating a permitted measure of at least one of software bugs, security advisories, or security vulnerabilities determined for other software, further comprising:
determining that the second software is associated with a stability metric indicating an actual measure of at least one of software bugs, security advisories, or security vulnerabilities determined for the second software; and
determining that the stability metric is less than or equal to the stability-preference metric.

16. The method of claim 9, wherein operational preferences comprise at least one of:
a risk-tolerance level indicating an allowable measure of risk associated with a predefined group of network devices;
a disallowed-operational list indicating at least one of security vulnerabilities or software bugs that are disallowed in the predefined group of network devices;
a preferred-operational list indicating a set of features that are preferred to be associated with the predefined group of network devices.

17. A system comprising:
one or more processors; and
one or more non-transitory computer-readable media storing computer-executable instructions that, when executed by the one or more processors, cause the one or more processors to:
obtain telemetry data associated with a plurality of network devices in a device network;
analyze the telemetry data to identify, from the plurality of network devices, a first group of network devices that share a first common functional attribute in the device network, and a second group of network devices in the device network that share a second common functional attribute, individual ones of the first group of network devices and the second group of network devices running first software;
generate a first device policy for the first group of network devices;
generate a second device policy for the second group of network devices;
store an indication of the first device policy for the first group of network devices indicating that the first group of network devices share the first common functional attribute in the device network;
store an indication of the second device policy for the second group of network devices indicating that the second group of network devices share the second common functional attribute in the device network;
receive, via a user account associated with the first group of network devices and the second group of network devices, input data defining a first operational preferences associated with the first group of network devices and input data defining a second operational preferences associated with the second group of network devices;
store a first association between the first operational preferences and the first device policy for the first group of network devices and a second association between the second operational preference and the second device policy for the second group of network devices;
identify second software configured for execution by individual ones of the first group of network devices and second group of network devices, wherein the second software satisfies the first operational preferences and is associated with the first common functional attribute of the first group of network devices;
determine that running the second software lowers a measure of risk associated with the first group of network devices as compared to running the first software;
determine that running the second software increases a measure of risk associated with the second group of network devices as compared to running the first software;
provide the user account with access to a first recommendation to run the second software on individual ones of the first group of network devices;
provide the user account with access to a second recommendation to continue running the first software on individual ones of the second group of network devices; and
cause the first group of network devices to run the second software.

18. The system of claim 17, comprising further computer-executable instructions that, when executed by the one or more processors, cause the one or more processors to:
collect first operational data that indicates a first current operating condition associated with the first group of network devices running the first software;
collect second operational data that indicates a second current operating condition associated with the second group of network devices running the first software;
determine, based at least in part on the first current operating condition, a first risk metric indicating a first measure of risk associated with the first group of network devices running the first software;

determine, based at least in part on the second current operating condition, a second risk metric indicating a second measure of risk associated with the second group of network devices running the first software;

determine that the first risk metric violates the first operational preferences; and determine that the second risk metric does not violate the second operational preferences.

19. The system of claim 17, wherein the first recommendation to run the second software on individual ones of the first group of network devices includes indications of software bugs or security vulnerabilities for the second software.

20. The system of claim 17, wherein operational preferences comprise at least one of:

a risk-tolerance level indicating an allowable measure of risk associated with a predetermined group of network devices;

a disallowed-operational list indicating at least one of security vulnerabilities or software bugs that are disallowed in the predetermined group of network devices;

a preferred-operational list indicating a set of features that are preferred to be associated with the predetermined group of network devices.

\* \* \* \* \*